US012645521B2

(12) United States Patent
Ding

(10) Patent No.: US 12,645,521 B2
(45) Date of Patent: Jun. 2, 2026

(54) REPLICATION MANAGEMENT SYSTEM WITH ENHANCED LOG ANALYSIS FUNCTIONALITY

(71) Applicant: SAP SE, Walldorf (DE)

(72) Inventor: Xuemin Ding, Shanghai (CN)

(73) Assignee: SAP SE, Walldorf (DE)

( * ) Notice: Subject to any disclaimer, the term of this patent is extended or adjusted under 35 U.S.C. 154(b) by 73 days.

(21) Appl. No.: 18/198,907

(22) Filed: May 18, 2023

(65) Prior Publication Data

US 2024/0385922 A1     Nov. 21, 2024

(51) Int. Cl.
| *G06F 11/07* | (2006.01) |
| *G06F 11/362* | (2025.01) |
| *G06F 16/23* | (2019.01) |
| *G06F 16/2455* | (2019.01) |
| *G06F 16/248* | (2019.01) |

(52) U.S. Cl.
CPC ........ *G06F 11/0775* (2013.01); *G06F 11/362* (2013.01); *G06F 16/2379* (2019.01); *G06F 16/2455* (2019.01); *G06F 16/248* (2019.01)

(58) Field of Classification Search
CPC .............. G06F 11/0775; G06F 11/362; G06F 16/2379; G06F 16/2455; G06F 16/248
USPC ........................................................ 707/648
See application file for complete search history.

(56) References Cited

U.S. PATENT DOCUMENTS

| 7,343,626 | B1 * | 3/2008 | Gallagher | ............. | G06F 21/577 |
| | | | | | 707/999.009 |
| 10,581,886 | B1 * | 3/2020 | Sharifi Mehr | ...... | H04L 63/1441 |

| 10,762,049 | B1 * | 9/2020 | Liang | ...................... | G06F 8/427 |
| 11,113,301 | B1 * | 9/2021 | Modestino | .......... | G06F 16/1752 |
| 2007/0185939 | A1 * | 8/2007 | Prahland | ............. | G06F 16/1734 |
| 2016/0275101 | A1 * | 9/2016 | Hinterbichler | ...... | G06F 16/1734 |
| 2017/0178026 | A1 | 6/2017 | Thomas et al. | | |
| 2018/0129497 | A1 * | 5/2018 | Biddle | ............... | G06F 11/3668 |
| 2018/0189339 | A1 * | 7/2018 | Ananthakrishnan | ......................... |
| | | | | | G06F 11/3006 |

(Continued)

FOREIGN PATENT DOCUMENTS

| CN | 103544298 A | 1/2014 |
| CN | 107330034 A | 11/2017 |
| CN | 108416054 A | 8/2018 |

OTHER PUBLICATIONS

"Amazon CloudWatch Logs User Guide," Amazon Web Services, 2022, pp. 1-239.
"Filtering Logs and Traces," Dec. 7, 2022, 6 pages.

*Primary Examiner* — Hicham Skhoun
(74) *Attorney, Agent, or Firm* — Sterne, Kessler, Goldstein & Fox P.L.L.C.

(57) ABSTRACT

Various embodiments for a replication assistant and log analyzer system are described herein. An embodiment operates by receiving a selection of a plurality of log files generated by an application. A query is received on the plurality of log files, the query comprising one or more terms. The plurality of log files are searched for the one or more terms corresponding to the query. A result of the searching is generated for display, the result comprising: a first indicator as to which of the plurality of log entries of which of the plurality of log files include the one or more terms, and a second indicator as to which of the different components of the application each of the log entries correspond. The result including is displayed, wherein the log entries are sorted by the timestamp of the log entries across the plurality of log files.

14 Claims, 10 Drawing Sheets

100

(56)                    References Cited

U.S. PATENT DOCUMENTS

| | | | | |
|---|---|---|---|---|
| 2019/0205197 A1* | 7/2019 | Hartman | ............... | G06F 11/079 |
| 2020/0201300 A1* | 6/2020 | Baba | ............... | G05B 19/41835 |
| 2022/0121628 A1* | 4/2022 | Devaraj | ............... | G06F 11/323 |
| 2023/0072123 A1* | 3/2023 | Sethu | ....................... | G06N 5/02 |
| 2023/0088164 A1* | 3/2023 | Varada | ............... | G06F 11/3698 |
| | | | | 717/123 |
| 2023/0385267 A1* | 11/2023 | Russell | ............... | G06F 11/1451 |
| 2024/0242031 A1* | 7/2024 | Arrigoni | ............... | G06F 40/289 |

* cited by examiner

Figure 2:
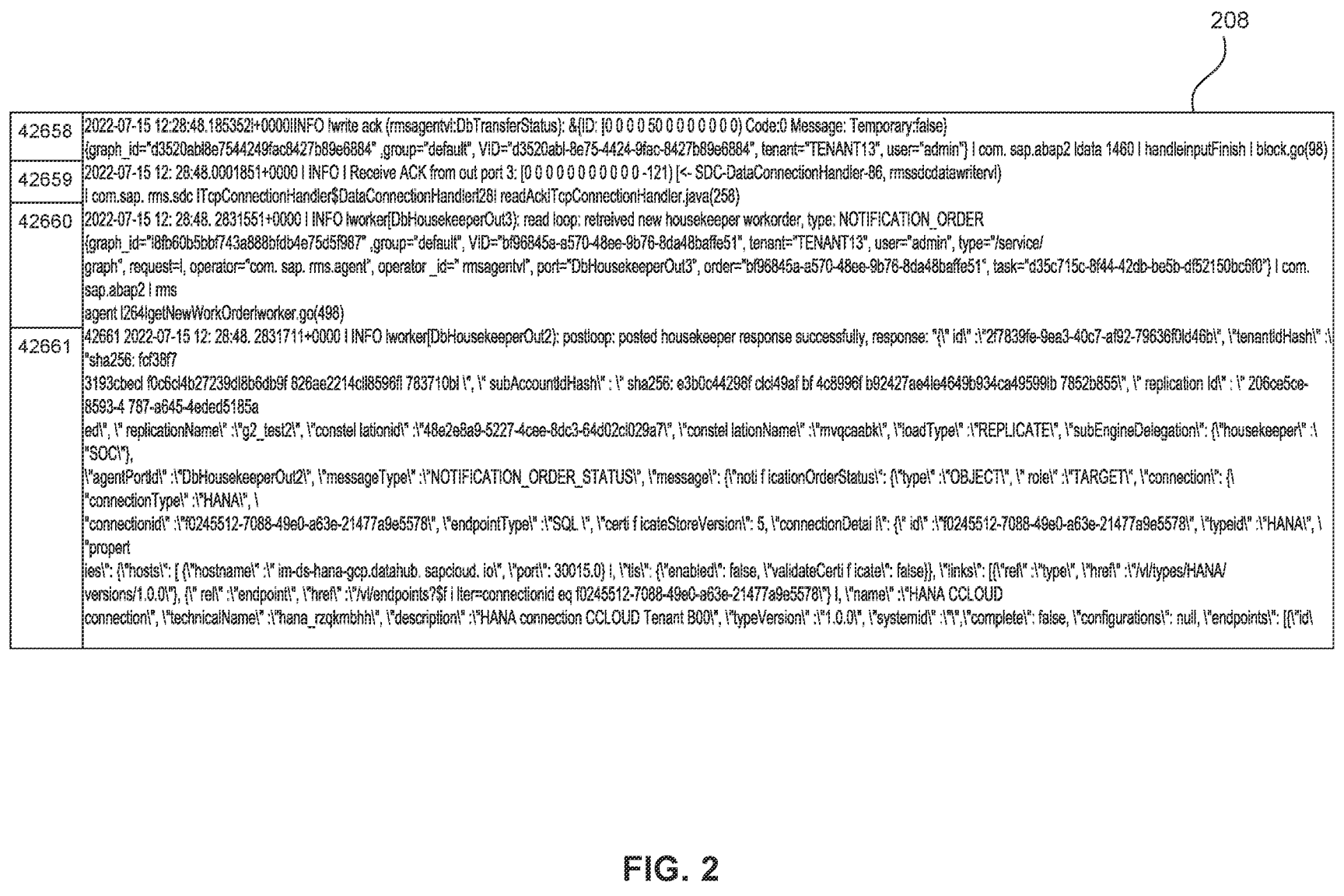

208

| 42658 | 2022-07-15 12:28:48.185352|+0000|INFO |write ack (rmsagentv:DbTransferStatus): &{ID: [0 0 0 0 50 0 0 0 0 0 0] Code:0 Message: Temporary:false} |graph_id="d3520abl0e7544249fac84271b89e6884" ,group="default", VID="d3520abl-8e75-4424-9fac-8427b89e6884", tenant="TENANT13", user="admin"] | com. sap.abap2 |data 1460 | handlerinputFinish | block.go(98) |
| 42659 | 2022-07-15 12:28:48.000185|+0300 | INFO | Receive ACK from out port 3: [0 0 0 0 0 0 0 0 0 0 -121] |<- SDC-DataConnectionHandler-86, rmsdcdatawriterv| | com.sap.rms.sdc |TcpConnectionHandler$DataConnectionHandler|28| readAckiTcpConnectionHandler.java(258) |
| 42660 | 2022-07-15 12:28:48.283155|+0000 | INFO |worker[DbHousekeeperOut3}; read loop: retrieved new housekeeper workorder, type: NOTIFICATION_ORDER |graph_id="l8lb60b5b0f743a888bfdb4e75d5f987" ,group="default", VID="b968455a-a570-48ee-9b76-3da48baffe51", tenant="TENANT13", user="admin", type="service/ graph", request=l, operator="com. sap. rms.agent", operator_id="" rmsagentv", VID="b968455a-a570-48ee-9b76-8da48baffe51", task="d35c715c-8444-42db-be5b-df52150bc6f0"] | com. sap.abap2 | rms agent |264|getNewWorkOrderlworker.go(496) |
| 42661 | 42661 2022-07-15 12:28.48. 283171|+0000 | INFO |worker[DbHousekeeperOut2}; postloop: posted housekeeper response successfully, response: {\"id\" .\"2778393e-9aa3-40c7-af92-79636f9ld46h1\", \"tenantidHash\" \:\"sha256: fc3387 3193cbed f0c5c44b27233dd8lb3d3b9f 826ae2214d8596f| 7637110h1 \", \" subAccountidHash\" .\" sha256: e3b0c44298f cfc549af bf 4c8996f b924427ae4le4649b934ca4958lb 7852b855\", \" replication Id\" .\" 206ce5ce-8593-4 787-a645-4eded5185a edl\", \" replicationName\" .\"g2_test2\", \"constel lationid\" .\"48e2e8a9-5227-4cee-8dc3-64d02cl029a7\", \"constel lation\" .\"48e2e8a9-5227-4cee-8dc3-64d02cl029a7\", \"message\" {\"notificationOrderStatus\": {\"Type\": \"OBJECT\", \"role\": \"TARGET\", \"connection\": {\ \"SOC\", \"agentPortid\" .\"DbHousekeeperOut2\", \"messageType\" .\"NOTIFICATION_ORDER_STATUS\", \"message\" {\"notificationOrderStatus\": {\"Type\": \"OBJECT\", \"role\": \"TARGET\", \"connection\": {\ \"connectionType\" .\"HANA\", \ \"connectionid\" .\"f0245512-7088-49e0-a63e-21477a9e5578\", \"endpointType\" .\"SQL \", \"certificateStoreVersion\": 5, \"connectionDetail l\". {\" id\" .\"f0245512-7088-49e0-a63e-21477a9e5578\", \"typeid\" .\"HANA\", \ propert lest\", {\"hosts\": [ {\"hostname\" .\" im-ds-hana-gcp.datahub sapcloud. iol\", \"port\": 30015.0} ], \"list\". {\"enabled\": false, \"validateCertificate\": false}], \"links\": [{\"ref\" .\"type\", \"href\" .\"/\/type\/HANA\ version\/1.0.0\"}, {\" ref\" .\"endpoint\", \"href\" .\"/\/endpoints?\$f l ter=connectionid eq f0245512-7088-49e0-a63e-21477a9e5578\"} ], \"name\" .\"HANA CCLOUD connection\", \"technicalName\" .\"hana_zqkmbhn\", \"description\" .\"HANA connection CCLOUD Tenant B00R\", \"typeVersion\" .\"1.0.0\", \"systemid\" .\"\", \"completel\": false, \"configurations\": null, \"endpoints\": null, \"endpoints\": [{\"id

Figure 5A:
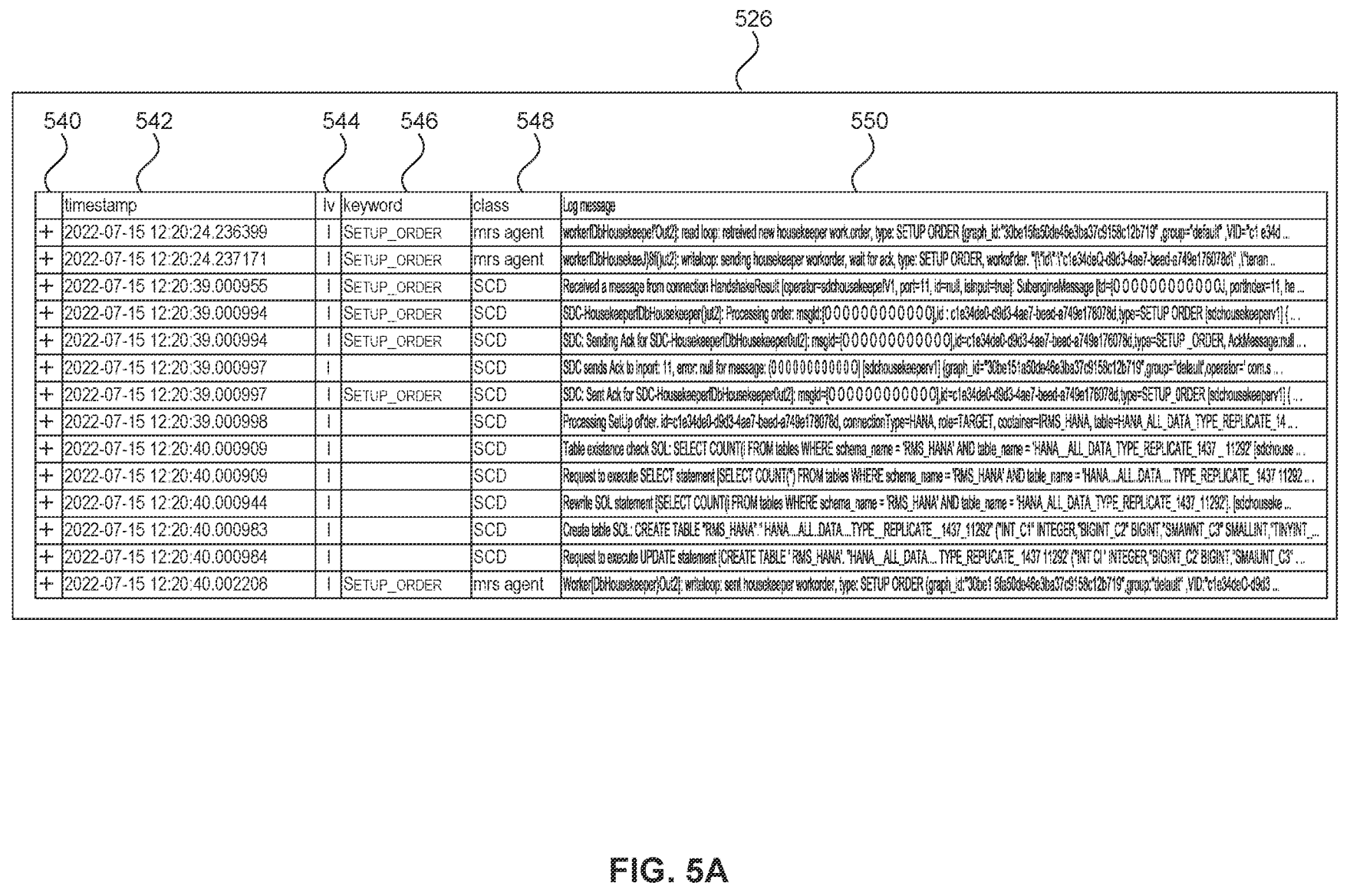

| timestamp | lv | keyword | class | Log message |
|---|---|---|---|---|
| 2022-07-15 12:20:24.236399 | 1 | SETUP_ORDER | mrs agent | workerIDtHousekeeperfOut2}; read loop: retrieved new housekeeper work order, type: SETUP ORDER {graph_id:"30be16a630a46e3dba37c9158c12b719", group="default" WID="b1:e34d... |
| 2022-07-15 12:20:24.237171 | 1 | SETUP_ORDER | mrs agent | workerIDtHousekeeperJ5ft[u2}; writeloop: sending housekeeper workorder, wait for ack, type: SETUP ORDER, workorder: "1:b1":b1:e34da6a-c8d63-4de7-bee4-a749e1760786t","tran... |
| 2022-07-15 12:20:39.000955 | 1 | SETUP_ORDER | SCD | Received a message from connection HandshakeResult {operator=sdchousekeeperN1, port=11, id=null, isInput=true}: SubengineMessage {fid=0 0 0 0 0 0 0 0 0 0 G}, portIndex=11, ha... |
| 2022-07-15 12:20:39.000994 | 1 | SETUP_ORDER | SCD | SDC-HousekeeperIDtHousekeeper[u2}; Processing order: msgId{0 0 0 0 0 0 0 0 0 0 0}{jc1: c1e34da6a-c8d63-4de7-bee4-a749e1760786t,type=SETUP ORDER [sdchousekeeperv1{... |
| 2022-07-15 12:20:39.000994 | 1 | SETUP_ORDER | SCD | SDC: Sending Ack for SDC-HousekeeperIDtHousekeeper[u2}; msgId={0 0 0 0 0 0 0 0 0 0 0}{jc=c1e34da6a-c8d63-4de7-bee4-a749e1760786t,type=SETUP_ORDER, AckMessage:null ... |
| 2022-07-15 12:20:39.000997 | 1 | | SCD | SSC sends Ack to import 11, error: null for message: {0 0 0 0 0 0 0 0 0 0}[addrhousekeeperv1{graph_id="30be15:a630a46e3dba37c9158c12b719" group="default" operator=" com.s... |
| 2022-07-15 12:20:39.000997 | 1 | SETUP_ORDER | SCD | SSC: Start Ack for SDC-HousekeeperIDtHousekeeper[u2}; msgId={0 0 0 0 0 0 0 0 0 0 0}{jc=c1e34da6a-c8d63-4de7-bee4-a749e1760786t,type=SETUP_ORDER [sdchousekeeperv1{... |
| 2022-07-15 12:20:39.000998 | 1 | | SCD | Processing SetUp order: id=c1e34da6a-c8d63-4de7-bee4-a749e1760786t, connection type=HANA, role=TARGET, container=RMS_HANA, table_name = "RMS_HANA" AND table... |
| 2022-07-15 12:20:40.000909 | 1 | | SCD | Table existence check SQL: SELECT COUNT() FROM tables WHERE schema_name = "RMS_HANA" AND table_name = HANA__ALL_DATA__TYPE_REPLICATE_1437_11292 [sdchousewse... |
| 2022-07-15 12:20:40.000909 | 1 | | SCD | Request to execute SQL statement {SELECT COUNT() FROM tables WHERE schema_name = "RMS_HANA" AND table_name = HANA_ALL_DATA_TYPE_REPLICATE_1437_11292... |
| 2022-07-15 12:20:40.000944 | 1 | | SCD | Rewrite SQL statement {SELECT COUNT() FROM tables WHERE schema_name = "RMS_HANA_ALL_DATA__TYPE_REPLICATE_1437_11292 [sdchouswse... |
| 2022-07-15 12:20:40.000983 | 1 | | SCD | Create table SQL: CREATE TABLE "RMS_HANA"."HANA__ALL_DATA__TYPE_REPLICATE_1437_11292 ("INT_C1" INTEGER "BIGINT_C2" BIGINT "SMALLINT_C3" SMALLINT "TINYINT_... |
| 2022-07-15 12:20:40.000984 | 1 | | SCD | Request to execute UPDATE statement {CREATE TABLE "RMS_HANA"."HANA__ALL_DATA__TYPE_REPLICATE_1437_11292 ("INT_C1" INTEGER "BIGINT_C2" BIGINT "SMALLINT_C3"... |
| 2022-07-15 12:20:40.002208 | 1 | SETUP_ORDER | mrs agent | workerIDtHousekeeperfOut2}; writeloop: sent housekeeper workorder, type: SETUP ORDER {graph_id:"30be16a630a46e3dba37c9158c12b719" group="default" WID="b1:e34d... |

Figure 5B:
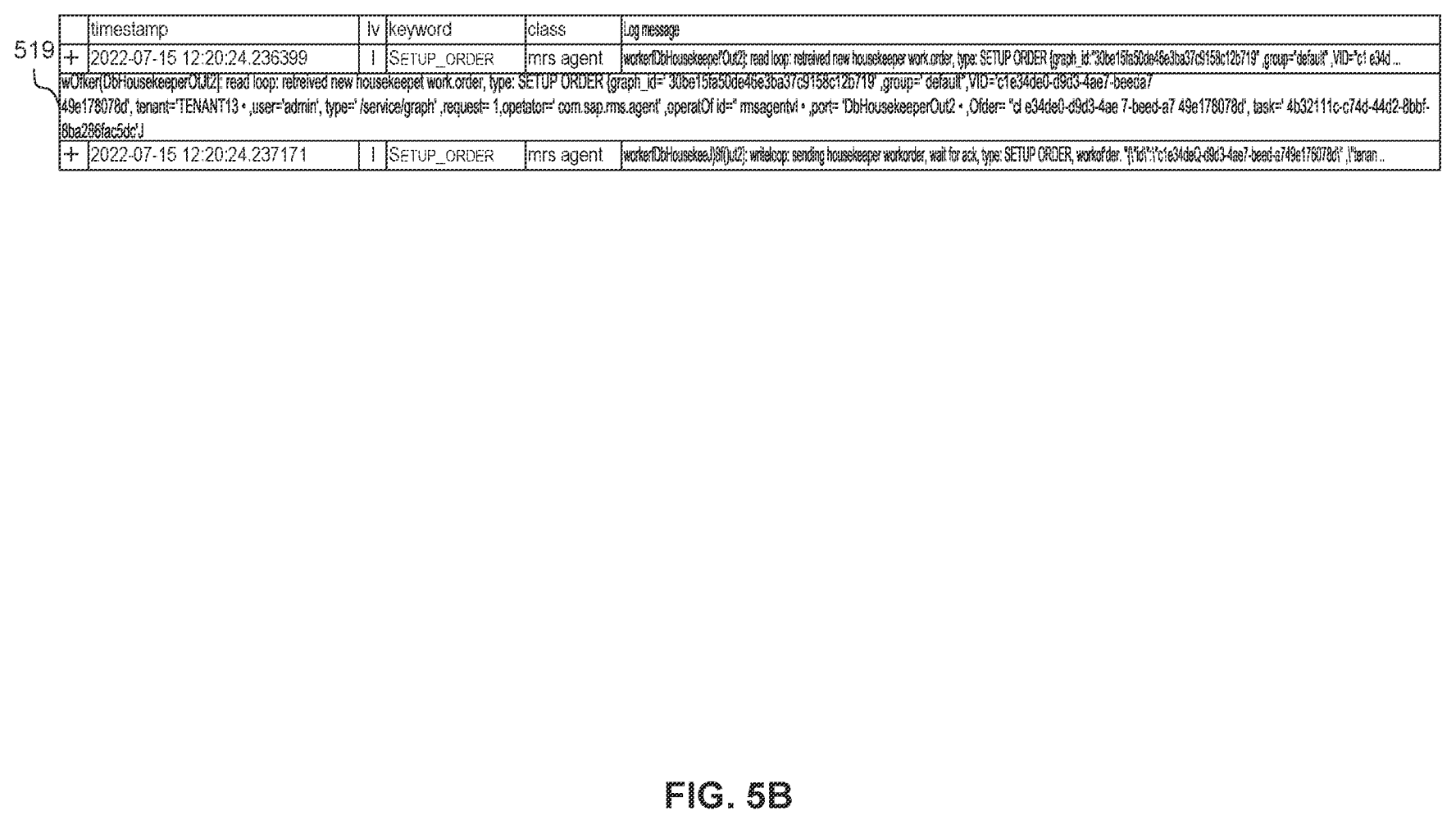

| timestamp | lv | keyword | class | Log message |
|---|---|---|---|---|
| 519 + 2022-07-15 12:20:24.236399 | 1 | SETUP_ORDER | mrs agent | worker[DbHousekeeperOut2]: read loop: retrieved new housekeeper work.order, type: SETUP_ORDER {graph_id="30be15b530de46e36a37d9158c12b719", group="default", VID='c1 e44... |
| wOrker[DbHousekeeperOut2]: read loop: retrieved new housekeeper work.order, type: SETUP_ORDER {graph_id="30be15b530de46e36a37d9158c12b719", group="default", VID='c1e344de0-89d3-4ae7-beea7 49e1780780d', tenant='TENANT13', user='admin', type='/service/graph', request='com.sap.mrs.agent', operation= 1,operator='com.sap.mrs.agent', request= 1,operation='/service/graph' ,request='com.sap.mrs.agent', port='DbHousekeeperOut2', Order= 'c1 e344de0-89d3-4ae7-beea7-49e1780780d', task=' 4b32111c-c74d-44d2-9bbf-9ba2368ac5dc'.] | | | | |
| + 2022-07-15 12:20:24.237171 | 1 | SETUP_ORDER | mrs agent | worker[DbHousekeeperJSt]jjd2]: writeloop: sending housekeeper workorder, wait for ack, type: SETUP_ORDER, workorder: "[1c1c1c1c344de0-89d3-4ae7-beea7-c749e1780780d', "tenan... |

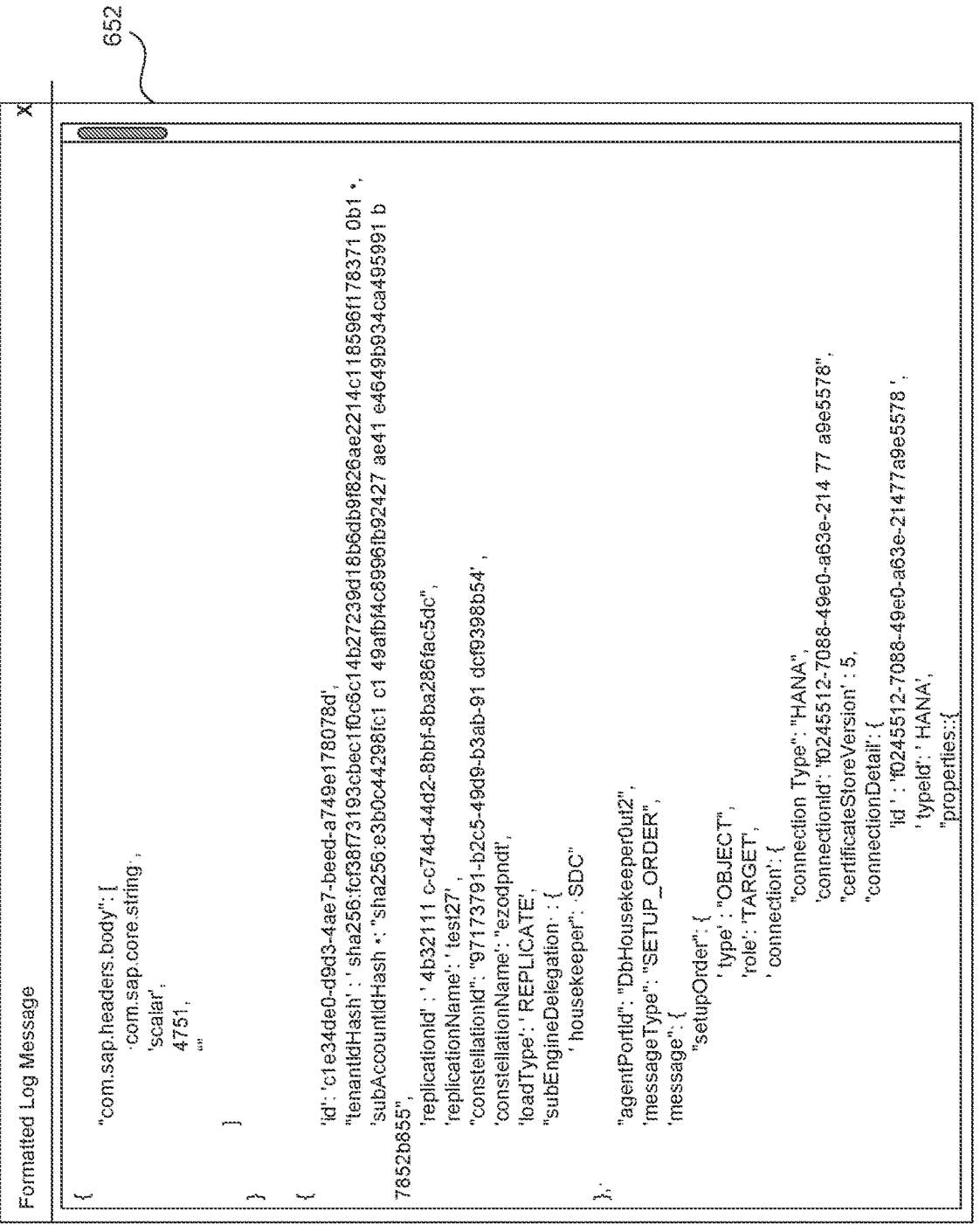

Formatted Log Message

```
{
  "com.sap.headers.body": [
    'com.sap.core.string',
    'scalar',
    4751,
    ''
  ]
}
{
  'id': 'c1e34de0-d9d3-4ae7-beed-a749e178078d',
  "tenantIdHash": 'sha256:fcf38f73193cbec1f0c5c14b27239d18b6db9f826ae2214c1185961178371 0b1',
  'subAccountIdHash': "sha256:e3b0c44298fc1 c1 49afbf4c8996fb92427 ae41 e4649b934ca495991 b
7852b855",
  'replicationId': '4b32111 c-c74d-44d2-8bbf-8ba286fac5dc',
  'replicationName': 'test27',
  "constellationId": "97173791-b2c5-49d9-b3ab-91 dcf9398b54",
  'constellationName': 'ezodpndt',
  'loadType': 'REPLICATE',
  'subEngineDelegation': {
    'housekeeper': 'SDC'
  }
};
{
  "agentPortId": "DbHousekeeperOut2",
  'messageType': "SETUP_ORDER",
  'message': {
    'setupOrder': {
      'type': "OBJECT",
      'role': 'TARGET',
      'connection': {
        "connection Type": "HANA",
        "connectionId": 'f0245512-7088-49e0-a63e-214 77 a9e5578",
        "certificateStoreVersion': 5,
        "connectionDetail': {
          'id': 'f0245512-7088-49e0-a63e-21477a9e5578 ',
          'typeId': ' HANA',
          'properties':{
```

FIG. 6

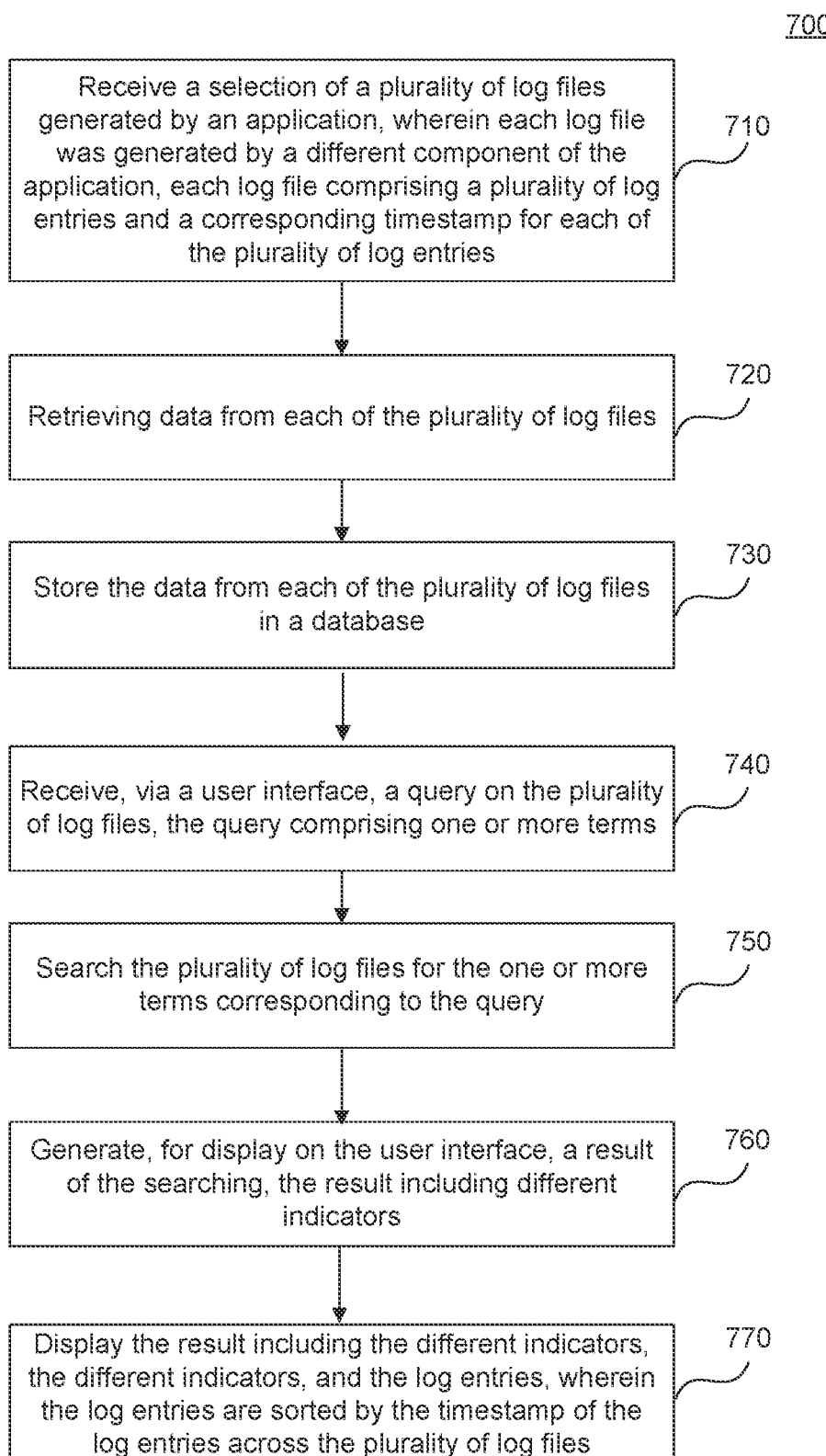

700

Receive a selection of a plurality of log files generated by an application, wherein each log file was generated by a different component of the application, each log file comprising a plurality of log entries and a corresponding timestamp for each of the plurality of log entries — 710

Retrieving data from each of the plurality of log files — 720

Store the data from each of the plurality of log files in a database — 730

Receive, via a user interface, a query on the plurality of log files, the query comprising one or more terms — 740

Search the plurality of log files for the one or more terms corresponding to the query — 750

Generate, for display on the user interface, a result of the searching, the result including different indicators — 760

Display the result including the different indicators, the different indicators, and the log entries, wherein the log entries are sorted by the timestamp of the log entries across the plurality of log files — 770

FIG. 7

REPLICATION MANAGEMENT SYSTEM WITH ENHANCED LOG ANALYSIS FUNCTIONALITY

BACKGROUND

When something goes wrong with a computing program or application, a developer will often have to check the logs of the program to identify where the problem occurred. However, manually analyzing a log of a program is a tedious, time intensive, and resource draining task which can slow down the development cycle, increase customer dissatisfaction with a system, prolong downtimes, and cost an organization time and money. This problem may become further pronounced during replication, when systems may be paused or taken offline to complete replication and an error occurs.

BRIEF DESCRIPTION OF THE FIGURES

The accompanying drawings are incorporated herein and form a part of the specification.

FIG. 2 is a screenshot of an example log file 208, according to some embodiments.

FIGS. 5A-5B illustrates an example of query results, according to some example embodiments.

FIG. 6 illustrates a file utility feature of LDS 102, according to some embodiments.

FIG. 7 is a flowchart illustrating a process 700 for a log and development system (LDS) 102, according to some embodiments.

In the drawings, like reference numbers generally indicate identical or similar elements. Additionally, generally, the left-most digit(s) of a reference number identifies the drawing in which the reference number first appears.

DETAILED DESCRIPTION

When something goes wrong with a computing program or application, a developer will often have to check the logs of the program to identify where the problem occurred. However, manually analyzing a log of a program is a tedious, time intensive, and resource draining task which can slow down the development cycle, increase customer dissatisfaction with a system, prolong downtimes, and cost an organization time and money. This problem may become further pronounced during replication, when systems may be paused or taken offline to complete replication and an error occurs.

Figure 1:
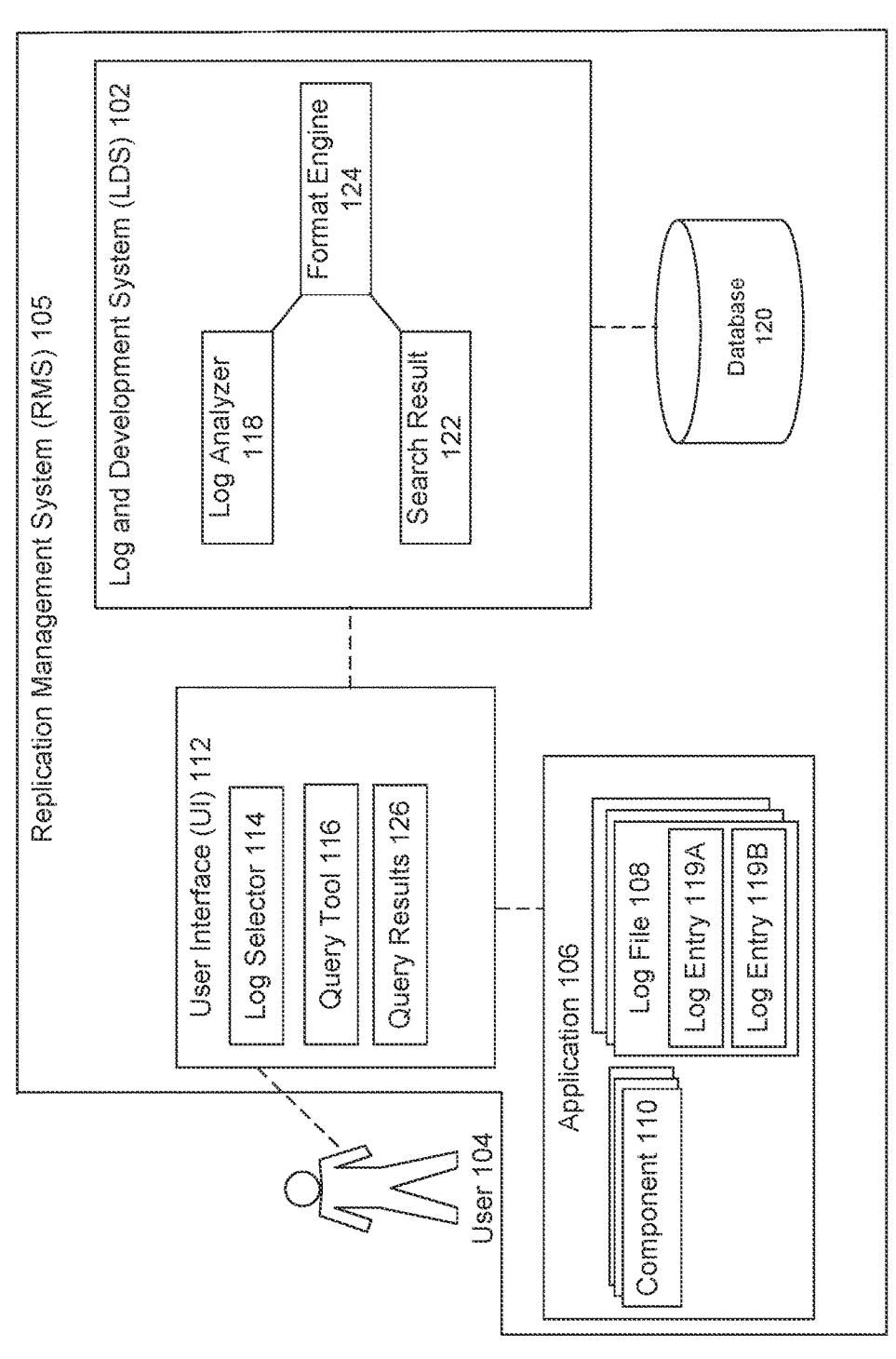
FIG. 1 illustrates a block diagram 100 illustrating a log and development system (LDS) 102, according to some example embodiments.

FIG. 1 illustrates a block diagram 100 illustrating a log and development system (LDS) 102, according to some example embodiments. In some embodiments, LDS 102 may identify or help a user 104 identify where an error occurred in an application 106 based on an analysis of one or more log files 108. The log files 108 may track the execution and communication between various components 110 of application 106 during one or more executions or instances of application 106. As illustrated in FIG. 1, there may be multiple components 110 and multiple log files 108.

In some embodiments, LDS 102 may operate as a replication assistant with application 106 may be integrated within a replication management system (RMS) 105. RMS 105 may be a system that copies (and transforms) data from a source location to a target location. It is understood that RMS 105 is an example implementation of LDS 102 as described herein, and the example embodiments described herein with regard to replication are exemplary only, and the system is not limited to replication management. Other example systems include a search system or any other data management system. LDS 102 may be used by any application 106 or system that produces multiple log files 108. In some embodiments, LDS 102 may be beneficial in the speeding up the development process to debug the application 106 or system.

Application 106 may be a computing program or computing device or computing system, that participates in the replication process or other processing (when used in other non-replication activities or tasks, with systems other than RMS 105) using various components 110. Application 106 may include the performance or participation of any computing process, including but not limited to replication. LDS 102 may be utilized to help identify where errors or exceptions occur during a computing process, such as a replication process, which would help speed up the process. Further, in some embodiments, the source system may be paused or stopped for a period of time during the computing (e.g., replication) process, LDS 102 may help minimize the downtime and increase system throughput by shortening the troubleshooting phase of computing (e.g., replication) when errors or exceptions occur.

In some embodiments, application 106 may include multiple different components 110 which may execute or be executed as part of application 106. A component 110 may comprise any module, function, object, engine, or process of application 106 (or group of processes) which generates its own log file 108. In some embodiments, a component 110 may include a plurality of different functions which have been grouped together, and which all write to the same log file 108.

In some embodiments, during the execution of a function or request by application 106, multiple components 110 may communicate with one another, and the communications and executions of the components 110 may be tracked across the log files 108, in which each log file 108 corresponds to a different component 110. Together, the various log files 108 may track the execution of the function or request by application 106. This use of multiple log files 108 may complicate the manual analysis of the log files for a user 104 who is trying to identify where an error occurred, because it would require opening up and simultaneously attempting to analyze the log entries 119A-B across multiple different log files 108, across different components 110 which may be transmitting data back and forth or even performing operations simultaneously.

As noted above, in some embodiments, the application 106 may include one or more components 110 that perform functionality related to the replication or movement of data from a source computing system to a target computing system as performed by a replication management system (RMS) 105. RMS 105 may include a computing system of one or more computing devices that performs data replication, movement, and/or transformations. For example, RMS 105 may allow user 104 to move data from a source location (not shown) to a target location (not shown).

In some embodiments, the replication or movement of data may be successful, and there may be no need for user 104 to view or access log files 108. However, if an error occurs during the execution of application 106 (which may be configured to perform the data replication or movement), then user 104 may need to view and decipher the log files 108 to identify what happened and/or fix the problem, to get complete the replication as soon as possible and get the source systems up and running as quickly as possible.

If an error occurs during the execution of the application 106, the log files 108 may be beneficial to identify where the error occurred (e.g., in which component 110 or code section). However, one of the issues a user 104 may encounter in trying to identify where the error occurred is that log files 108 are generally extremely difficult for a human user 104 to read and search through. Searching a log file 108 to try and identify an error is a time and resource intensive and tedious process that is prone to human error. And these difficulties multiply exponentially when application 106 generates multiple log files 108 for different components 110, any one of which, may have been the source of the error.

LDS 102 may help a user 104 identify where the error occurred, in which log file 108, and even in which component 110, which can reduce development time and reduce the resources (including manpower/time) that would have otherwise been wasted in trying to find the error. The actual computing processes being performed by RMS 105 and/or application 106 is irrelevant to LDS 102, whether the process is replication or another computing process, LDS 102 focuses on the structure or format of the log files 108 that are generated by the application 106. With a definition of what log files 108 are being generated by application 106, LDS 102 may be used in any variety of computing processes to help increase system speed, throughput, debugging, development, and minimize system downtime.

In some embodiments, a user 104 may interact with LDS 102 through a user interface (UI) 112. UI 112 may include a web interface, app, application, or other portal through which user 104 may access the functionality of LDS 102.

In some embodiments, UI 112 may provide log selector tool 114. Log selector 114 may include one or more user interface components that a user 104 may use to select and/or upload one or more log files 108 for analysis. As noted above, each log file 108 may correspond to or track the execution of a different component 110 of application 106. In some embodiments, UI 112 may include multiple log selector tools 114, and each log selector tool 114 may correspond to allowing the user 104 to upload a different types of log file 108.

In some embodiments, LDS 102 may track or identify how many log files 108 were generated during a most-recent execution, or during an execution of application 106. LDS 102 may configure UI 112 with a corresponding number of log selectors 114 (e.g., one log selector 114 for each log file 108). Then, for example, with different applications 106, that generate different number of log files 108, UI 112 may include different numbers or arrangements of the log selector 114.

FIG. 2 is an illustration of an example log file 208, according to some embodiments. The log file 208 is an example of log file 108. As may be seen, the text of the log file is garbled and difficult to read, and search or analyze by a user 104. Each log entry 119 may include its own identifier (42658, 42659, 42660, 42661) and may include its own date and time stamp.

Figure 3A:
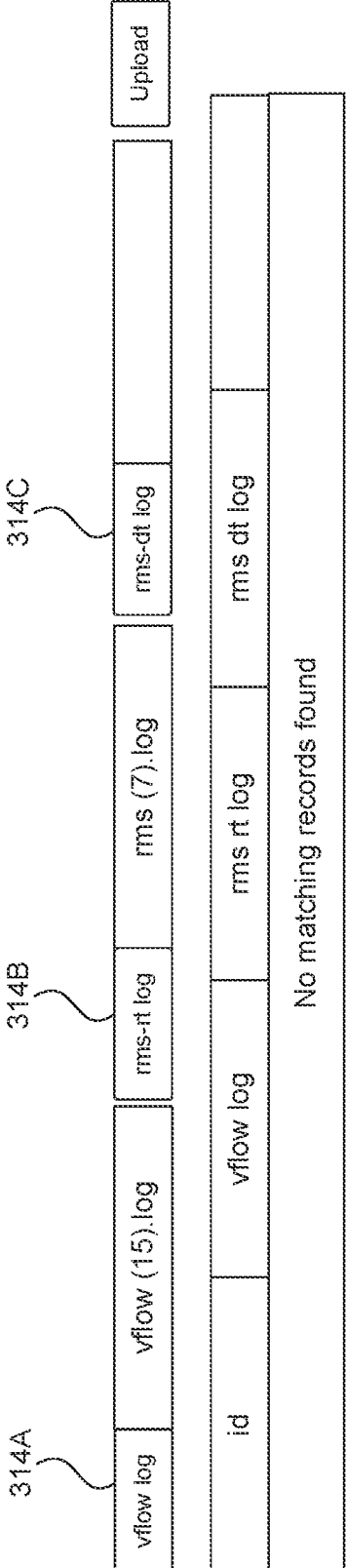
FIGS. 3A and 3B illustrate example operations of the log selector tool 114, according to some embodiments.
Figure 3B:
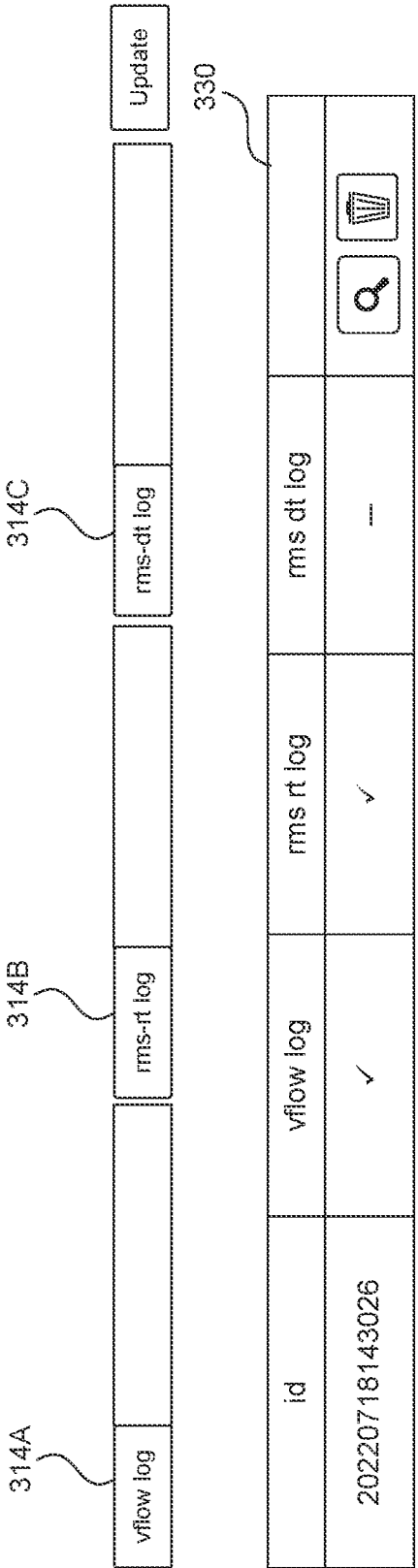

FIGS. 3A and 3B illustrate example operations of the log selector tool 114, according to some embodiments. In FIG. 3A, three log selector tools 314A, 314B, and 314C are illustrated. Each tool 314A-C may correspond to a different log file 108 that is generated by an application 106 with which LDS 102 is configured to operate. In some embodiments, log file 108 may correspond to a different component 110 (or group of components sharing the same log file 108) from application 106.

In some embodiments, the log selector tools 314A-C may correspond to the three main services of RMS 105. The vflow log may include a lot of operators. When replication runs on a local environment, it may generate several log files 108 such as rms-rt and rms-dt and vflow simultaneously, which contain log messages for all the operators. These log files 108 may be very big (e.g., hundreds of megabytes), and some of them include one or more secondary log files or JSON files (as discussed in greater detail below). LDS 102 performs a formatting search and analysis on the log files 108, by allowing several log files 108 to be combined into a single search while being displayed in a way that is sensible to the user 104. LDS 102 also provides quick and pre-formatted access to any JSON files.

In some embodiments, the log selector tools 314A-C may include a button with a label indicating the name of the corresponding log file 108 or type of log file 108 to be uploaded with the tool. For example, log selector tool 314A is labeled vflow log and may be selected to upload a log file 108 with vflow in its title or corresponding to one or more vflow components. In the example illustrated, vflow(15).log may indicate the name of a select vflow log file to upload.

As illustrated, the user 104 may select and simultaneously upload multiple log files 108. In the example illustrated, the user 104 has selected two of the possible three log files 108 for upload (vflow (15).log and rms(7).log). It is understood that in other embodiments, other numbers of log files 108 may be uploaded. In some embodiments, a single log selector tool 114 may be used to select all the various log files 108 for upload.

While FIG. 3A illustrates the log selector tools 314A-314C of UI 112 prior to a selection of the upload command, FIG. 3B illustrates the log selector tools 314A-314C after the upload. Section 330 may provide a status of the uploads. In the example illustrated, the id may correspond to a log analyzer identifier (which may be saved and reloaded later), in the example illustrated the id may correspond to the upload of the flow and rms rt log files (vflow (15).log and rms(7).log as illustrated in FIG. 3A) to LDS 102.

The second, third, and fourth columns may correspond to the log selector tools 314A-314C, respectively and provide a status of the uploads. As illustrated, each column may include a status indicator, in which the checkmark indicates a successful upload and/or data retrieval, and the dash or minus symbol may indicate that no log file corresponding to the log selector tool 314C was selected for upload. In some embodiments, an x may indicate a failed upload or data retrieval of a selected log file.

The status of the log file uploads in section 330 may be beneficial for a user by indicating which log files 108 were selected (and not selected) for upload. This may further be beneficial when analyzing the log entries 119 (as described in greater detail below with conjunction with FIG. 5A. For example, LDS 102 may include FIG. 3B as a header portion and FIG. 5A as a body portion of the UI 112. Then, for example, from UI 112, if the log entries 119 of FIG. 5A, do not include a log entry 119 from particular log file 108, the user 104 may quickly determine whether or not the log file 108 was uploaded based on the status indicators in FIG. 3B.

In some embodiments, each log file that was uploaded may be color coded with each log selector tool 314A-C. For example, the log selector tool 314A may be blue, the log selector tool 314B may be purple, and the log selector tool 314C may be yellow. Then, for example, when log entries 119 are displayed (as described in further detail in FIG. 5A), those log entries 119 may be color coded to correspond to the log file 108 (and log selector tool 314) from which the log entries were extracted.

In some embodiments, if only a single log selector tool 114 is used to select multiple log files 108, then a format engine 124 of LDS 102 may display the name of each selected log file 108 in an assigned color. Then any log entries 119 for that log file may be displayed in the same assigned color.

The last column of section 330 may allow a user 104 to delete one or more of the uploaded log files 108 (as indicated by the trash can), or perform a query, filter, or search command on the log files as indicated by the magnifying glass which may launch the query tool 116 (e.g., as illustrated in FIG. 1).

Using query tool 116, a user 104 may perform a search on the selected or uploaded log files 108 (e.g., as indicated by the check boxes). As will be described in greater detail below, LDS 102 may perform a search on the uploaded log files 108 and return color coded and sorted results that simplify and expedite the code debugging process.

Figure 4:
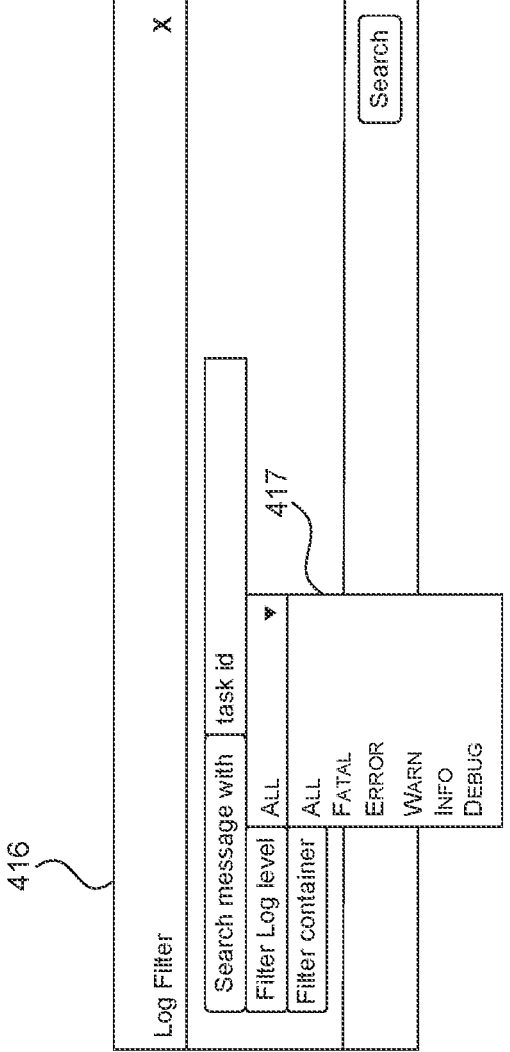
FIG. 4 is an example of a query tool 416, according to some embodiments.

FIG. 4 is an example of a query tool 416, according to some embodiments. Query tool 416 is an example of query tool 116 from FIG. 1. In the first box labeled "Search messages with", the user 104 may enter one or more search terms, variables, or values to be searched for in the log files 108.

The second box (filter log level) allows the user 104 to filer by log level, and several example filters are illustrated in the drop down box 417. In the example illustrated, box 417 allows the user 104 to select by the type of error (which may be combined with the terms, if any, entered in the first search terms box). The values in the drop down box 417 are for illustrative purposes only, and may be specific to application 106 or the types of content in the log files 108. For example, a first type of log file 108 may only include a first set of errors, while a second type of log file 108 may only include a second set of errors. The drop down list 417 may include only the first set of errors (and not the second set of errors) if only the first log file 108 is uploaded.

In some embodiments, LDS 102 may perform an initial scan of the uploaded log files and identify which types of errors or commands are included in the log files 108. For example, from an initial list of ten different possible errors, only the listed values in drop down list 417 may have been detected in the uploaded log files 108. Then for example, the user 104 will become aware of which errors were detected and are not included, which may simplify the search and avoid unnecessary time and resources that may otherwise be wasted on looking for errors that do not exist in the log files 108.

Returning to FIG. 1, upon receiving a selection of one or more log files 108 by user 104 via log selector 114, a log analyzer 118 may retrieve and upload the selected log files 108. In some embodiments, the log files 108 may already be stored locally for LDS 102 to access without uploading.

In some embodiments, log analyzer 118 may store the log files 108 in a database 120, across one or more tables. Storing the log files 108 in database 120, may enable log analyzer 118 to quickly and efficiently query the log files 108 based on any query parameters and/or search terms specified by user 104 via query tool 116, utilizing the functionality of the database 120. In some embodiments, each log file 108 may be stored in a different table of database 120, in some embodiments, multiple log files 108 (or even all the log files 108) may be combined into a single table of database 120.

Each log file 108 may include one or more log entries 119A, 119B (referred to generally as log entry 119 or log entries 119). For simplicity, only two log entries 119A-B are illustrated, however it is understood a log file 108 may include any number of log entries 119, include thousands of lines of log entries 119. In some embodiments, each log entry 119 may correspond to a different line, function, or subset of code that was executed during a run-time operation of a particular component 110 of application 106, as captured in the log file 108. Each log entry 119 may include a date/time stamp and other details of execution, such as what values were received, output, and what function(s) were executed, and whether an error or exception occurred.

When a query is received from query tool 116, the log analyzer 118 may submit the query to database 120. Database 120 may execute the query and return a search result 122. The search result 122 may include the various log entries 119 stored in database 120, across one or more tables and may include log entries 119 from any and all of the log files 108 selected by the user 108 that satisfy the query submitted by the user 104.

In some embodiments, search results 122 may include multiple different search results 122 for each of the tables of database 120 searched (e.g., whereby, each table corresponds to a different log file 108). LDS 102 may instruct database 120 to separately store the log entries 119 for each log file 108 in a different table because it may reduce the resources required for managing the log entries 119, and allowing the user 104 greater flexibility in adding/removing log files 108 and performing concurrent searches for query amongst the different tables.

A format engine 124 may format the search results 122 for display, to make the search results 122 easier to read and understand for a human user 104. For example, format engine 124 may combine all the search results 122, across the different log files 108 into a single set of search results including log entries 119 spanning across all the different, relevant log files 108. In some embodiments, there may be log files 108 that are intentionally excluded from the search results 122 based on the user preferences in the query.

As noted above, each log selector 114 or log file 108 may be assigned a different color on the user interface. This color coding may help make reading and understanding the search results easier for a user 104. In some embodiments, format engine 124 may color code the log entries of the combined search result 122 to correspond to the log selector 114 from which the corresponding log file 108 was uploaded.

For example, if the color corresponding to a first log selector 114 is blue, and log file ABC was uploaded using the first log selector 114, then any corresponding log entries 119 from log file ABC will be displayed in blue. If the color corresponding to a second log selector 114 is purple, and a second log file DEF was uploaded using the second log selector 114, then any corresponding log entries 119 from log file DEF will be displayed in purple. In some embodiments, LDS 102 may maintain the color coding across iterations so that a user understands that a first type of log file 108 (uploaded using the first log selector tool 114) is always the same color (e.g., blue), and a second log file 108 type is always the same color (e.g., purple).

In some embodiments, format engine 124 may also extract a portion of a log entry 119 for display on user interface 108. In some embodiments, a single log entry 119 may include many lines of text which will not visibly fit on a single line of a user interface 112. To improve readability, format engine 124 may extract a portion of the log entry 119 for display on a single line in the UI 112. As will be discussed in greater detail below (particularly with respect to FIGS. 5A and 5B), LDS 102 may provide a tool or user interface function that enables a user 104 to see the full text of a log entry 119.

In some embodiments, the selected portion of a log entry 119 may include the first set of characters that fit within the allotted space in UI 112. For example, format engine 124 may select the first 40 characters of a log entry 119. In some embodiments, the number of characters may vary based on the size of a display screen on which user 104 is viewing UI 112. For example, a desktop monitor may include more characters per line than a tablet screen, while the tablet may include more characters per log entry 119 than a mobile phone.

In some embodiments, rather than just including the first set number of characters (e.g., 40 characters), format engine 124 may select a portion of a log entry 119 for display to include the input and output values, which may be followed by the first set of characters that fit in the remaining space in the UI 112. In other embodiments, the selected portion of a log entry 119 may include any portion of the log entry 119 that includes a searched for term related to the query from the query tool 116. Format engine 124 may generate and provide for display a set of formatted query results 126.

FIG. 5A illustrates an example of query results 526, according to some example embodiments. The query results 526 are an example of query results 126 of FIG. 1. Column 550 includes at least a portion of the text from the log entry 119, as selected or extracted by format engine 124, as described above. Column 540 has a plus sign that indicates that the text from the log entry 119 displayed in column 550 is only a portion of the log entry 119. A user may select the plus sign and LDS 102 may provide, via UI 112, the full text of a log entry 519 is illustrated in FIG. 5B.

As illustrated in FIG. 5B, the plus sign is now a minus sign, indicating that the full text of the log entry 519 is being displayed or is currently visible. Leg entry 519 is an example of log entry 119 of FIG. 1. In some embodiments, a first log entry 119 may be short and the entire text may fit in the space allotted in column 550, in which case the plus sign may be a minus sign indicating that what the user sees in column 550 is the entire text of the log entry 119 for that particular line and there is nothing to expand and the minus sign would not be selectable by a user.

In FIG. 5A, each line corresponds to a different log entry 119 from one of the log files 108. As noted above, the displayed log entries 119 may be retrieved from different log files 108, and may be color coded for the user by format engine 124. For example, the first two entries may be color coded blue corresponding to a first log file 108 (that may have been selected with a first log selector tool 314A). The next eleven log entries 119 may be color coded purple corresponding to the second log selector tool 314B, and the following log entry 119 may be color coded blue again.

In some embodiments, the color coding may enable format engine 124 to arrange all the log entries 119 by their timestamp, regardless of which component 110 performed the execution and regardless of the log file 108 in which the execution was recorded, whereby the colors make it easy for the user 104 to track an execution of the application 106 across various components 110, including their communications and what values were passed back and forth to and from each component 110. Because there is already so much text for the user 104 to analyze/read, the color coding makes reading the remaining text of the log entries 119 easier and takes up less space on the UI 112 (relative to including an additional column indicating from which log file 108 a particular log entry 119 corresponds). In some embodiments, LDS 102 may provide functionality allowing the user 104 to sort by color (e.g., log file 108).

Column 542 includes the timestamp (time and date stamp) of each log entry 119. Column 544 includes a first indicator that indicates a log level. A log level may indicate a how much detail is provided in the log entry 119. For example, different log files 108 may include different amounts of information in the log entries 119, which may be referred to as a log level.

Column 546 includes the value of any keywords (e.g., from the search query) found or identified in a log entry. For example, a user may have searched for the value "app_name", and app_name may be a variable, and "SETUP_OR-DER" may indicate a value for the variable "app_name" as identified in the log entry 119. Column 548, "class" may be a name of the component 110 or class that was executed and that corresponds to the text of the log entry 119.

FIG. 6 illustrates a file utility feature of LDS 102, according to some embodiments. In some embodiments, particular log entries 119 may include a secondary log file corresponding to the log entry with additional details relevant to the log entry. In some embodiments, this secondary log file may be a JSON (JavaScript Object Notation) file, which may include details about data interchange (e.g., when components 110 are communicating with each other). In some embodiments, the main body displaying the log entries 119, as illustrated in FIG. 5A or FIG. 5B, may include an indicator, such as a paperclip, indicating there is a JSON or secondary log file available for viewing with a particular log entry 119. Then, for example, a selection of the indicator (e.g., paperclip), may cause the screen 652 to pop up and display on top of the general list of data entries 119 as shown in FIG. 5A.

Conventionally it is very difficult for a user to read a JSON file. First, the user has to identify the file, then copy text, and paste the text to a text editor application, which is then unformatted and difficult to read. Here, format engine 124 automatically identifies which log entries 119 are associated with secondary log files or JSON files. And the format engine 124 will automatically extract the text, format the text for display, and provide an icon on UI 112 for the user to see that there is a secondary log file available for viewing. When the user selects the icon from the UI 112, the window 652 including the pre-formatted text may be displayed for the user 104.

FIG. 7 is a flowchart illustrating a process 700 for a log and development system (LDS) 102, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to the figures.

In 710, a selection of a plurality of log files generated by an application is received, wherein each log file was generated by a different component of the application, each log file comprising a plurality of log entries and a corresponding timestamp for each of the plurality of log entries. For example, a user 104 may use log selectors 314A-C as illustrated in FIG. 3A to select different log files 108. The log files 108 may each correspond to a different component 110 of an application 106. The application 106 may be configured to perform replication tasks, using the components 110, as part of RMS 105. Each log entry 119 may have its own timestamp and log identifier.

In 720, data from each of the plurality of log files is retrieved. For example, log analyzer 118 may retrieve data from the log files 108 and provide that data to a database 120.

In 730, the data from each of the plurality of log files is stored in a database. For example, database 120 may store the data of each log file 108 in a different table of database 120.

In 740, a query on the plurality of log files is received via a user interface, the query comprising one or more terms. For example, LDS 102 may receive a query on the selected log files 108 from the query tool 116, the query may include search terms and other selected options as illustrated in FIG. 4.

In 750, the plurality of log files are searched for the one or more terms corresponding to the query. For example, the query from query tool 118 may be provided to database 120 to perform a search, and the database 120 may return a search result 122. In some embodiment, the search result 122 may include combination of queries executed against different log files 108 stored in different tables of database 120, and may include log entries 119 spanning the various selected log files 108.

In 760, a result of the searching is generated for display on the user interface, the result including different indicators. For example, a format engine 124 may concatenate a portion of the log entries 119 for display and color code the log entries 119 based on which log file 108 they correspond as well as performing other formatting operations, to generate query results 126 which are then displayed on UI 112.

In 770, the result including the different indicators, and the log entries is displayed on the user interface, wherein the log entries are sorted by the timestamp of the log entries across the plurality of log files. For example, in the query result 526 (which is an example of query result 126 of FIG. 1) as illustrated in FIG. 5A, the log entries may be sorted by the timestamp 542, and may include various indicators 544, 546, 548 providing additional information about the concatenated or shortened version of the log entry displayed in column 550.

Figure 8:
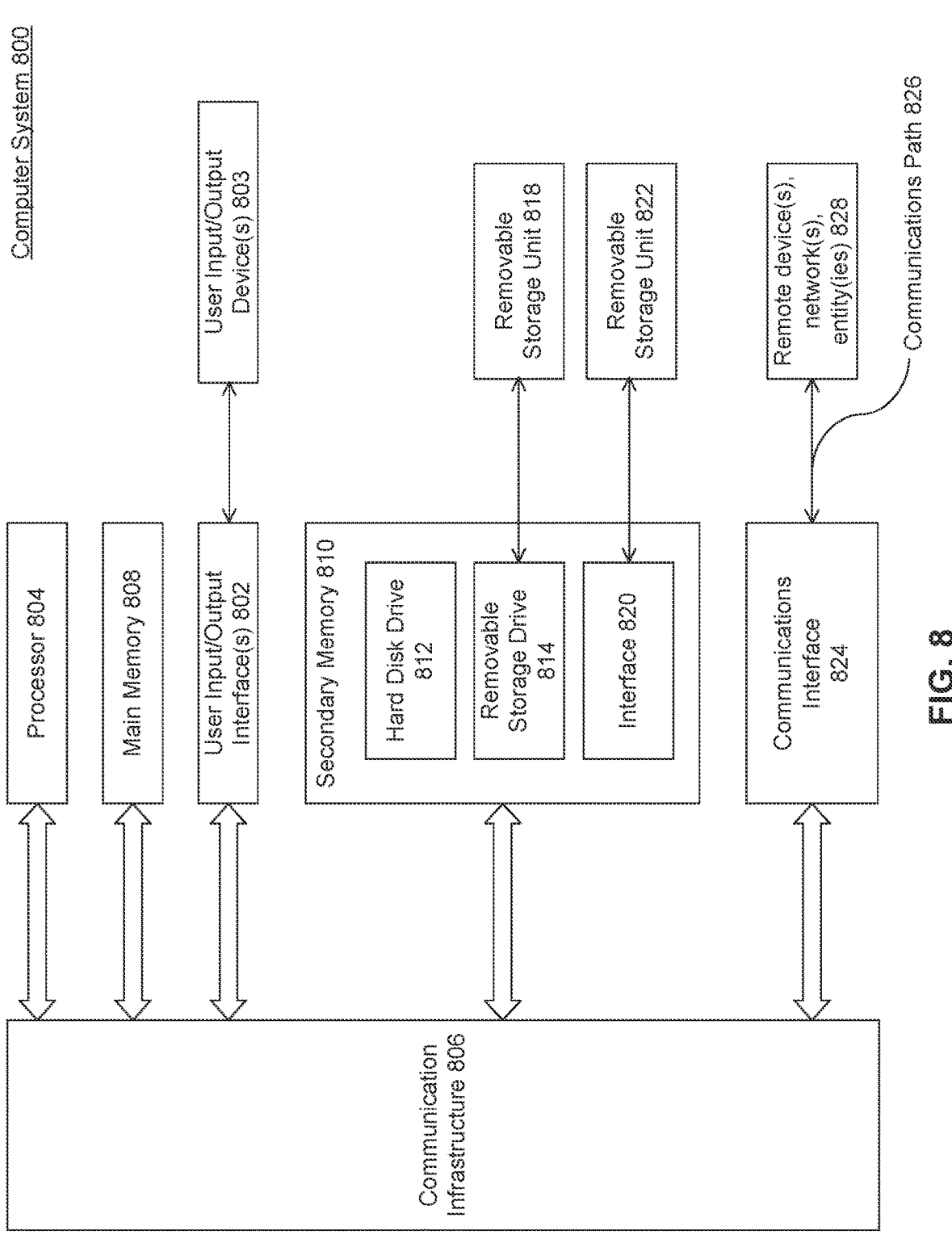
FIG. 8 illustrates an example computer system useful for implementing various embodiments.

Various embodiments and/or components therein can be implemented, for example, using one or more computer systems, such as computer system 800 shown in FIG. 8. Computer system 800 can be any computer or computing device capable of performing the functions described herein. For example, one or more computer systems 800 can be used to implement any embodiments, and/or any combination or sub-combination thereof.

Computer system 800 includes one or more processors (also called central processing units, or CPUs), such as a processor 804. Processor 804 is connected to a communication infrastructure or bus 806. Computer system 800 may represent or comprise one or more systems on chip (SOC).

One or more processors 804 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 can include one or more levels of cache. Main memory 808 has stored therein control logic (i.e., computer software) and/or data.

Computer system 800 can also include one or more secondary storage devices or memory 810. Secondary memory 810 can include, for example, a hard disk drive 812 and/or a removable storage device or drive 814. Removable storage drive 814 can be a floppy disk drive, a magnetic tape drive, a compact disk drive, an optical storage device, tape backup device, and/or any other storage device/drive.

Removable storage drive 814 can interact with a removable storage unit 818. Removable storage unit 818 includes a computer usable or readable storage device having stored thereon computer software (control logic) and/or data. Removable storage unit 818 can be a floppy disk, magnetic tape, compact disk, DVD, optical storage disk, memory card, and/any other computer data storage device. Removable storage drive 814 reads from and/or writes to removable storage unit 818 in a well-known manner.

According to an exemplary embodiment, secondary memory 810 can include other means, instrumentalities or other approaches for allowing computer programs and/or other instructions and/or data to be accessed by computer system 800. Such means, instrumentalities or other approaches can include, for example, a removable storage unit 822 and an interface 820. Examples of the removable storage unit 822 and the interface 820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 can further include a communication or network interface 824. Communication interface 824 enables computer system 800 to communicate and interact with any combination of remote devices, remote networks, remote entities, etc. (individually and collectively referenced by reference number 828). For example, communication interface 824 can allow computer system 800 to communicate with remote devices 828 over communications path 826, which can be wired and/or wireless, and which can include any combination of LANs, WANs, the Internet, etc. Control logic and/or data can be transmitted to and from computer system 800 via communication path 826.

In some embodiments, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

receiving a selection of a plurality of log files generated by a data replication application configured to perform data replication between a source system and a target system, wherein the source system is paused during the data replication, each log file was generated by a different component of the data replication application during the data replication, and each log file comprising a plurality of log entries and a corresponding timestamp for each of the plurality of log entries;

retrieving data from each of the plurality of log files;

storing the data from each of the plurality of log files in a database;

performing an initial scan of the plurality of log files in the database, prior to receiving a query on the plurality of log files, wherein the initial scan identifies a set of one or more errors included in the plurality of log files;

displaying, on a user interface, a visual indication of the set of one or more errors included in the plurality of log files;

receiving, via the user interface, the query on the plurality of log files, the query comprising one or more terms and a selection of one or more errors from the set of one or more errors corresponding to the visual indication;

searching the plurality of log files for the one or more terms corresponding to the query, wherein the searching identifies a result subset of the plurality of log entries comprising the one or more terms corresponding to the query;

in response to the searching, generating a JavaScript Object Notation (JSON) file for a corresponding log entry of the result subset, wherein the JSON file comprises JSON text extracted from the corresponding log entry;

generating, for display on the user interface, a result of the searching, the result comprising:

a first indicator as to which of the plurality of log entries of which of the plurality of log files are the result subset;

a second indicator as to which of the different components of the data replication application each of the log entries correspond; and a third indicator as to which log entry of the result subset is the corresponding log entry;

displaying the result including the first indicator, the second indicator, the third indicator, and the result subset, wherein the result subset is sorted by the timestamp of the result subset across the plurality of log files;

receiving, via the user interface, input selecting the third indicator of the corresponding log entry; and in response to receiving the input selecting the third indicator, displaying the JSON text in the JSON file on the user interface.

2. The method of claim 1, wherein the first indicator comprises a value of the one or more terms.

3. The method of claim 1, wherein the log entries are color coded to a corresponding one of the plurality of log files.

4. The method of claim 1, wherein the first indicator includes no value for at least a subset of the plurality of log entries displayed on the user interface.

5. The method of claim 1, where the displaying comprises both an indication of one or more log files that were selected and from which the data was retrieved, and an indication as to one or more log files that were not selected and from which data was not retrieved.

6. The method of claim 1, wherein the visual indication comprises a drop-down list of the one or more errors, and the selection of the one or more errors are selected from the drop-down list.

7. The method of claim 1, wherein the visual indication provides the set of one or more errors included in the plurality of log files, and a set of errors which were detected and not included.

8. A system comprising at least one processor, the at least one processor configured to perform operations comprising:

receiving a selection of a plurality of log files generated by a data replication application configured to perform data replication between a source system and a target system, wherein the source system is paused during the data replication, each log file was generated by a different component of the data replication application during the data replication, and each log file comprising a plurality of log entries and a corresponding timestamp for each of the plurality of log entries;

retrieving data from each of the plurality of log files;

storing the data from each of the plurality of log files in a database;

performing an initial scan of the plurality of log files in the database, prior to receiving a query on the plurality of log files, wherein the initial scan identifies a set of one or more errors included in the plurality of log files;

displaying, on a user interface, a visual indication of the set of one or more errors included in the plurality of log files;

receiving, via the user interface, the query on the plurality of log files, the query comprising one or more terms and a selection of one or more errors from the set of one or more errors corresponding to the visual indication;

searching the plurality of log files for the one or more terms corresponding to the query, wherein the searching identifies a result subset of the plurality of log entries comprising the one or more terms corresponding to the query;

in response to the searching, generating a JavaScript Object Notation (JSON) file for a corresponding log entry of the result subset, wherein the JSON file comprises JSON text extracted from the corresponding log entry;

generating, for display on the user interface, a result of the searching, the result comprising:

a first indicator as to which of the plurality of log entries of which of the plurality of log files are the result subset;

a second indicator as to which of the different components of the data replication application each of the log entries correspond; and a third indicator as to which log entry of the result subset is the corresponding log entry;

displaying the result including the first indicator, the second indicator, the third indicator, and the result subset, wherein the result subset is sorted by the timestamp of the result subset across the plurality of log files;

receiving, via the user interface, input selecting the third indicator of the corresponding log entry; and in response to receiving the input selecting the third indicator, displaying the JSON text in the JSON file on the user interface.

9. The system of claim 8, wherein the first indicator comprises a value of the one or more terms.

10. The system of claim 8, wherein the log entries are color coded to a corresponding one of the plurality of log files.

11. The system of claim 8, wherein the first indicator includes no value for at least a subset of the plurality of log entries displayed on the user interface.

12. The system of claim 8, where the displaying comprises both an indication of one or more log files that were selected and from which the data was retrieved, and an indication as to one or more log files that were not selected and from which data was not retrieved.

13. A non-transitory computer-readable medium having instructions stored thereon that, when executed by at least one computing device, cause the at least one computing device to perform operations comprising:

receiving a selection of a plurality of log files generated by a data replication application configured to perform data replication between a source system and a target system, wherein the source system is paused during the data replication, each log file was generated by a different component of the data replication application during the data replication, and each log file comprising a plurality of log entries and a corresponding timestamp for each of the plurality of log entries;

retrieving data from each of the plurality of log files;

storing the data from each of the plurality of log files in a database;

performing an initial scan of the plurality of log files in the database, prior to receiving a query on the plurality of log files, wherein the initial scan identifies a set of one or more errors included in the plurality of log files;

displaying, on a user interface, a visual indication of the set of one or more errors included in the plurality of log files;

receiving, via the user interface, the query on the plurality of log files, the query comprising one or more terms and a selection of one or more errors from the set of one or more errors corresponding to the visual indication;

searching the plurality of log files for the one or more terms corresponding to the query, wherein the searching identifies a result subset of the plurality of log entries comprising the one or more terms corresponding to the query;

in response to the searching, generating a JavaScript Object Notation (JSON) file for a corresponding log entry of the result subset, wherein the JSON file comprises JSON text extracted from the corresponding log entry;

generating, for display on the user interface, a result of the searching, the result comprising:

a first indicator as to which of the plurality of log entries of which of the plurality of log files are the result subset;

a second indicator as to which of the different components of the data replication application each of the log entries correspond; and a third indicator as to which log entry of the result subset is the corresponding log entry;

displaying the result including the first indicator, the second indicator, the third indicator, and the result subset, wherein the result subset is sorted by the timestamp of the result subset across the plurality of log files;

receiving, via the user interface, input selecting the third indicator of the corresponding log entry; and in response to receiving the input selecting the third indicator, displaying the JSON text in the JSON file on the user interface.

14. The non-transitory computer-readable medium of claim 13, wherein the log entries are color coded to a corresponding one of the plurality of log files.

* * * * *